United States Patent
Slaney et al.

(10) Patent No.: US 8,417,573 B2
(45) Date of Patent: Apr. 9, 2013

(54) SPONSORED LISTING RECOMMENDATION ENGINE

(75) Inventors: Malcolm Slaney, Sunnyvale, CA (US); Dennis Martin DeCoste, Mercer Island, WA (US); Ian C. Rogers, Santa Monica, CA (US); Michael Spiegelman, Los Angeles, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1789 days.

(21) Appl. No.: 11/717,982

(22) Filed: Mar. 14, 2007

(65) Prior Publication Data
US 2008/0228587 A1    Sep. 18, 2008

(51) Int. Cl.
*G06Q 30/00*    (2006.01)

(52) U.S. Cl.
USPC .................................................. 705/26.1

(58) Field of Classification Search ............... 705/26.1, 705/26.7
See application file for complete search history.

(56) References Cited

U.S. PATENT DOCUMENTS

| | | | |
|---|---|---|---|
| 6,269,361 B1 | 7/2001 | Davis et al. | 707/3 |
| 7,024,485 B2 | 4/2006 | Dunning et al. | 709/232 |
| 7,711,838 B1 | 5/2010 | Boulter et al. | 709/200 |
| 2003/0046399 A1 | 3/2003 | Boulter et al. | 709/228 |
| 2004/0064374 A1* | 4/2004 | Cho | 705/26 |
| 2005/0102202 A1* | 5/2005 | Linden et al. | 705/27 |

OTHER PUBLICATIONS

E. Boehlert, Will Congress tackle pay-for-play?, published at Salon.com, Jun. 25, 2002 (7 pages).
D. Fain and J. Pedersen, "Sponsored Search: A Brief History," Second Workshop on Sponsored Search Auctions, Jun. 11, 2006 (3 pages).
K. Bartz, V. Murthi, S. Sebastian, "Logistic Regression and Collaborative Filtering for Sponsored Search Term Recommendation," Second Workshop on Sponsored Search Auctions, Jun. 11, 2006 (5 pages).

* cited by examiner

*Primary Examiner* — Mila Airapetian
(74) *Attorney, Agent, or Firm* — Brinks Hofer Gilson & Lione

(57) ABSTRACT

An online music system includes a music database configured to store musical selections and to store a user profile for respective users of the online music system, an advertiser account management system to store bid amounts from advertisers seeking to provide information to the users of the online music system and a user recommendation system coupled to the music database to present information about musical selections to respective users based on the stored user profile and the stored bid amounts.

23 Claims, 6 Drawing Sheets

SPONSORED LISTING RECOMMENDATION ENGINE

BACKGROUND

The present invention relates generally to database systems. More particularly, the present invention relates to a sponsored listing recommendation engine.

The availability of powerful tools for developing and distributing Internet content has led to an increase in information, products, and services offered through the Internet, as well as a dramatic growth in the number and types of consumers using the Internet. To sift through this immense volume of information, a user often submits queries to search engines that provide responsive information that meets the criteria specified by the queries. Internet content providers monitor queries and selections made by users and tailor recommendations and content provided to the users.

On example of such an online search engine system is disclosed in U.S. Pat. No. 6,269,361 entitled "System and Method for Influencing a Position on a Search Result List Generated by a Computer Network Search Engine" and assigned to Overture Services, Inc. This patent discloses a system and method in which online advertisers may influence the position of their sponsored search listings in search results provided to a searcher. The advertisers submit search listings having bid amounts and search terms or keywords. The advertisers may submit any number of search terms to the online system. In response to a user query, the online search system returns relevant search results having keywords that match the user's query, including some associated with advertisers. The search results are ordered in part using the bid amounts.

Another example of such a system is disclosed in US Patent publication number 2003-0046399 A1 entitled "Online playback system with community bias" and assigned to Launch Media, Inc. This document discloses an online music system in which subscribers can create their own station by expressing their musical preferences. In this system, information derived from user accounts forms the basis of an online community. Collateral preferences allow other subscribing individuals to enjoy the benefit of wider-ranging tastes according to the preferences expressed by the other members of the community. Additionally, assuming that individuals sharing one preference in common may be likely to share others, the disclosed system allows those who choose to listen to a "fan station" the ability to enjoy similar music or other data streams according to preferences expressed by the fan community as a whole. The system makes recommendations to a listener based on community preferences.

While such systems have been successful at providing music to listeners in accordance with their preferences, there may be opportunities to provide additional music selections to listeners which are outside the user's specifically expressed interest, or even the community's expressed interest.

BRIEF SUMMARY

By way of introduction only, the present disclosure provides in a first embodiment a method for operating an online music system that provides music to users. The method includes storing a user profile for respective users of the online music system, storing bid amounts from advertisers seeking to provide information to the users of the online music system, and presenting information about musical selections to respective users based on the stored user profile and the stored bid amounts.

In a second embodiment, the present disclosure provides an online music system which includes a music database configured to store musical selections and to store a user profile for respective users of the online music system. The system further includes an advertiser account-management system to store bid amounts from advertisers seeking to provide information to the users of the online music system and a user recommendation system coupled to the music database to present information about musical selections to respective users based on the stored user profile and the stored bid amounts.

In another embodiment, the present disclosure provides a method for an online music system. The method includes, communicating from a user recommendation system to a user a web page which includes user-selected songs, wherein selection of the user-selected songs is based on a current selection of songs by a user or on preferences of the user. The method further includes selecting one or more additional recommended songs from a set of sponsored music recommendations, each of the set of sponsored music recommendations being associated with an information provider having an account on the online music system and a computer network location, the selection of the additional recommended songs being based on the preferences of the user. The method still further includes providing to the user on the web page information about the one or more additional recommended songs, and detecting selection by the user of an additional recommended song.

In another embodiment, the present disclosure provides a database method which includes presenting to a user a web page including selected content wherein the selection of the selected content is based on user selection or on previously determined user preferences. The method further includes selecting one or more additional recommended selections from a set of sponsored recommendations, each of the set of sponsored recommendations having associated therewith an information provider and a computer network location, selection of the additional recommended selections being based on previously determined user content preferences. The method further includes presenting to the user on the web page the one or more additional recommended selections and detecting selection by the user of an additional recommended selection from the set of sponsored recommendations. Upon detection of the selection by the user. The method further includes presenting the additional recommended selection to the user.

The method further includes a method for providing music information to an online user. The method includes storing a music database of songs to be provided to users and storing a recommendation database of songs, each song being associated with an information provider and a money amount. The method further includes providing songs from the music database on a web page sent to a user in response to user requests, collecting user preference information about the provided songs and/or other songs in the music database and, based on the user preference information, providing recommended songs from the recommendation database on the web page sent to the user.

Still further, the present disclosure provides a database system for providing content to users. The database system includes a content database, a content provider coupled with the content database to provide content to a user, the content selected from the database to users based on user preferences and a sponsored recommendation database. The system further includes a sponsored recommendation provider coupled with the sponsored recommendation database to provide sponsored recommendations to the user based on the user preferences and a server coupled with the content provider and the sponsored recommendation provider to transmit to the user a web page including the selected content combined with the sponsored recommendations.

Still further, the present disclosure provides a music database system which includes a music database and a user preference learner coupled with the server to monitor user interactions with the music database system to identify user preferences based on the user interactions. The system further includes a sponsored recommendation database which stores recommended song files, each recommended song file being stored with a money amount and an information provider identification, the money amount being payable by the information provider when a recommended song file is referred to a user and is selected by a user. The system still further includes a server coupled with the music database for serving web pages to a subscriber, a served web page including information identifying song files from the music database to subscribers; the song files selected based on identified user preferences for the subscriber, the served web page further including information identifying one or more recommended song files, the recommended song files selected based on the identified user preferences for the subscriber.

These methods and systems provide value to customers in at least two ways. First, from the user's point of view, the user sees results that are directly related to the user's query. The online search system provides relevant results for each query. On the other hand, the online search provider has an opportunity to provide related results that possibly answer the user's broader needs. For example, when a query is received from a user for the brand name FORD, the online search system provides search results related to products of the Ford Motor Company. In addition, competitors such as General Motors and Toyota may be willing to sponsor search listings for the same keyword to put their advertisement in front of the user, because the user may be in the market for a new car. This gives the online search provider the opportunity to show the user sponsored search results that are outside the specific request.

DETAILED DESCRIPTION OF THE PRESENTLY PREFERRED EMBODIMENTS

Figure 1:
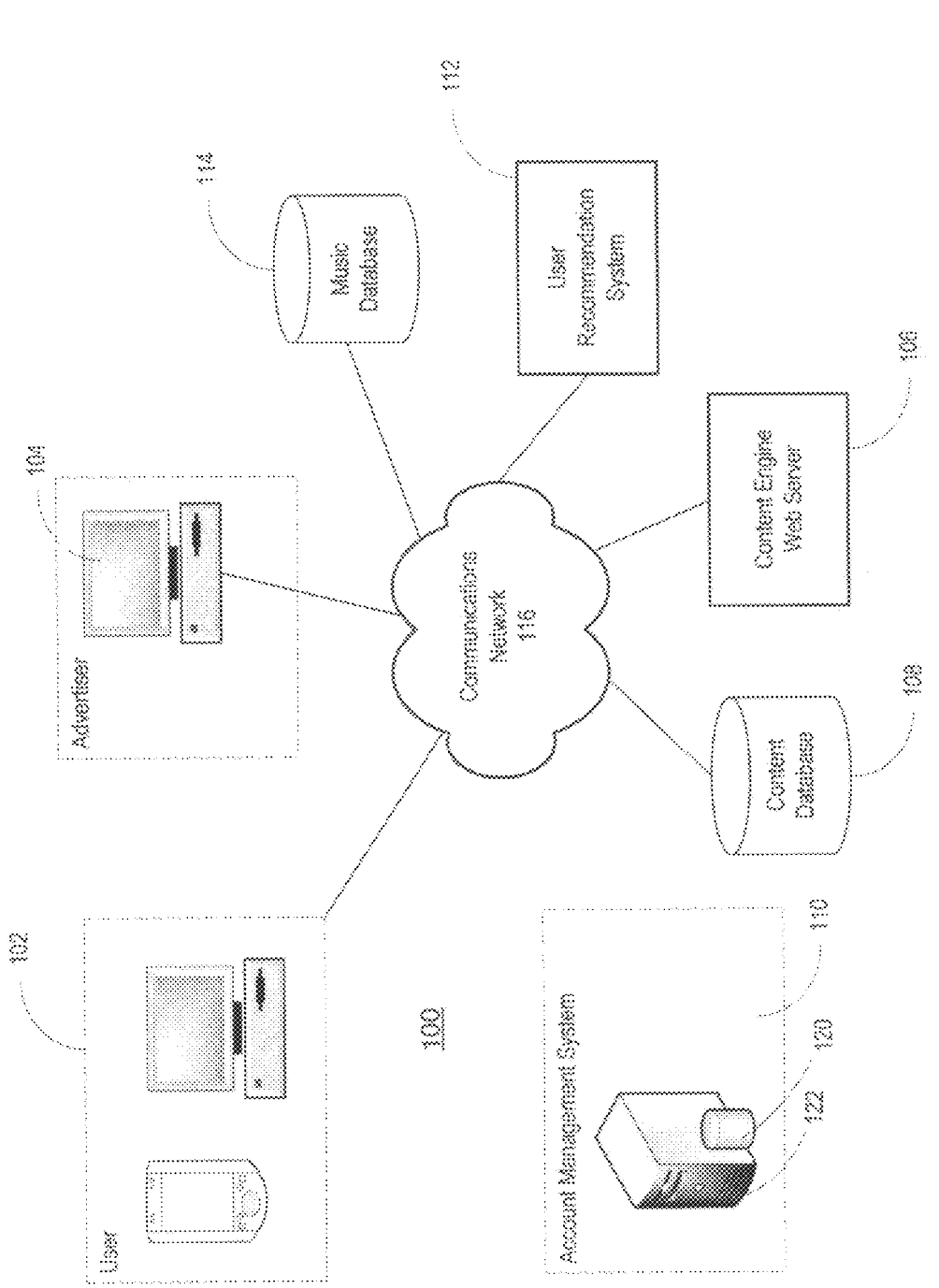
FIG. 1 shows an architecture for providing information and recommendations to an online user.

FIG. 1 shows an architecture 100 for providing information and recommendations to an online user. The architecture 100 includes a user client system 102, an advertiser client system 104, a content engine web server 106, a content database 108, an account management system 110, a user recommendation system 112 and a music database 114. Components of the system communicate data and information over a communications network 110. The user client system 110 may submit a request via the communications network 116 to the content engine web server 106, which may be implemented on a server or other network enabled system. The user recommendation system 112 monitors information about user preferences and makes recommendations to the user at the user client system 102. The advertiser client system 104 submits sponsored recommendations to the user recommendation system 112 which may be included with the recommendations made to the user client system 102. It will be appreciated that the components of the architecture 100 may be separate, may be supported on a single server or other network enabled system, or may be supported by any combination of servers or network enabled systems.

The communications network 116 may be any private or public communications network or combination of networks. The communications network 116 may be configured to couple one computing device, such as a server, system, database, or other network enabled device, to another device to enable communication of data between computing devices. The communications network 116 may generally be enabled to employ any form of machine-readable media for communicating information from one computing device to another. The communications network 116 may include one or more of a wireless network, a wired network, a local area network (LAN), a wide area network (WAN), a direct connection such as through a Universal Serial Bus (USB) port, and the like, and may include the set of interconnected networks that make up the Internet. The communications network 116 includes any communication method by which information may travel between computing devices.

The user client system 102 connects to the content engine web server 106 and the user recommendation system 112 via the communications network 116 using a standard browser application. A browser-based implementation allows system features to be accessible regardless of the underlying platform of the user client system 102. For example, the user client system 102 may be a desktop, laptop, handheld computer, cell phone, mobile messaging device, network enabled television, digital video recorder, such as a digital video recorder, automobile, or other network enabled user client system 102, which may use a variety of hardware and/or software packages. The user client system 102 may connect to the content engine web server 106 using a stand-alone application which may be platform-dependent or platform-independent. Other methods may be used to implement the user client system 102.

The advertiser client system 104 may be used by network information providers such as advertising web site promoters or owners having advertiser web pages. These advertising web site promoters, or advertisers, may wish to access account information residing on account management system 110. An advertising web site promoter may, through the account residing on the account management system 110, participate in a competitive bidding process with other advertisers. An advertiser may bid on users' musical interests or demographics which may be relevant to the content of the advertiser's web site.

Further, advertisers may sponsor recommendations to be made to users at the user client system 102. As will be described in greater detail below, user recommendation system 112 provides music and other information to a user of the user client system 102. The provided information is based at least in part on recommendations of songs or artists not specifically requested by the user. In addition, the provided information is based on a competitive bidding process among advertisers.

This process may be referred to as sponsored recommendation. The architecture 100 forms a marketplace where advertisers and other information providers can bid on users' interests. When a user is searching for music and specifies, for example, an artist, a song, a genre or other information, the user recommendation system 112 provides information matching the specific request. Further, if the user is part of an identified community, the system provides recommendations based on interests of other listeners who are part of the same community. Further, if the user's request matches a keyword or other information on which advertisers have bid, the system provides sponsored recommendations to the user. If the user selects a sponsored recommendation, for example, by clicking on a link provided to the user client system 102, the account of the advertiser associated with the clicked link is debited or the advertiser is otherwise charged by the bid amount.

The content engine web server 106 implements a content engine. The content engine is responsible for serving a list of content. Content includes in different embodiments some or all of music, videos, search listings or other information. The content engine delivers the content to users for user consumption. The content engine in some embodiments has information about user tastes and desires and uses processes such as collaborative filtering to choose content to send to a selected user. In addition, the content engine web server 106 permits network users, upon navigating to a uniform resource locator (URL) associated with the content engine web server 106 or other related site, to type keyword queries to identify pages of interest among the millions of pages available on the World Wide Web. In one embodiment, the content engine implemented by the content engine web server 106 generates a web page that includes, at least in part, relevant entries obtained from and formatted by information in the account management system 110. The content engine web server 106 generates a list of hypertext links to files or documents that contain information relevant to the user at the user client system 102. The content engine web server 106 transmits this web page to the network user, where it is displayed on the browser running on the user client system 102.

The account management system 110 includes computer storage medium 120 and a processing system 122. A database is stored on the storage medium 120 of the account management system 110. The database contains advertiser account information. The account information stored in the database includes information about the content of each advertiser who participates in the on-line marketplace established by the system. This information includes content, content descriptions, titles and URLs, bid amounts and other information as will be described below in greater detail. Further, the account information includes information produced by operation of the marketplace system, such as current rank and current bid for content offerings or each search listing, the number of clicks recorded for search listings, a calculated click through rate (CTR) and the advertiser's account balance. The processing system 122 may be accessed by advertisers and other information providers operating an advertiser client system 104.

The user recommendation system 112 monitors information about user preferences and makes recommendations to the user at the user client system 102. The user recommendation system 112 may make recommendations using any suitable algorithm or process. In one embodiment, the user recommendation system 112 uses collaborative filtering to determine what users prefer and to place similar information in front of those users. Collaborative filtering is a method of making automatic predictions about interests of a user by collecting taste information from many users. Collaborative filtering relies on the assumption that individuals who agreed in the past tend to agree again in the future. In one example, the collaborative filtering for music tastes as implemented by the user recommendation system 112 make predictions about which music a user will prefer given some information about that user's tastes. The resulting recommendations are specific to the user, but use information gleaned from many users.

In another embodiment, the user recommendation system 112 monitors content consumed or delivered to by the user and selections made by the user and identifies one or more communities of listeners to which the user belongs. The communities are defined by one or more common interests. For example, if the user listens to one or more musical selections by the artist Coldplay, the user recommendation system 112 may associate the user with a Coldplay community, a Modern Rock community and other communities for users with a preference for Coldplay.

Subsequently, when providing web pages of information to the user, the user recommendation system 112 makes selections from one or more of the communities to which the user belongs. The recommendations may be included in a list of search results in response to a specific request from the user. Alternatively, the recommendations may be included on the web page but separate from the search results. For example, if the user has expressed a preference for "Coldplay," the web page returned to the user client system 102 may include a list of songs by Coldplay, ranked in any convenient order and displayed in the center of the web page. In the margin of the page or otherwise adjacent to the search listings, the web page may also display text such as "If you are interested in COLDPLAY," you may also be interested in the following," and a list of recommendations. The recommendations may take the form of one or more hyperlinks which, when selected by clicking the hyperlink, return information about the user's selection to the user recommendation system 112. This selection is tracked by user recommendation system 112 and used for making further future recommendations. The listed recommendations may be other artists, other songs, other genres, or any other information associated with a community identified for the user. For example, the user recommendation system 112 may even recommend related products, such as books or periodicals or clothing or concert tickets which are associated with a community of which the user is a member.

In addition to content and recommendations, the user recommendation system 112 may also include sponsored recommendations on the web page returned to the user. A sponsored recommendation is information including, for example, text, a title, a hyperlink and associated URL and bid amount. The sponsored recommendation appears on the web page with, in one example, search results matching a search request from the user, recommendations made to the user based on communities to which the user belongs, and from a sponsored recommendation database such as music database 114. The sponsored recommendations may appear anywhere on the web page but are preferably positioned in the margin of the page.

The sponsored recommendation is prepared by an advertiser or other information provider and may be part of a competitive bidding process with other advertisers. The advertiser prepares a sponsored recommendation listing using, for example, the advertiser client system 104. The advertiser may manually or automatically edit the sponsored recommendation listing by providing a title, text for the body of the sponsored recommendation, a URL to which the user's browser will be redirected upon a clickthrough of the sponsored recommendation listing, and a bid amount. The bid amount is used for controlling the position among a set of sponsored recommendations at which the respective sponsored recommendation listing will appear. For example, if the sponsored recommendations are provided as a list on the page adjacent to available content or search results, sponsored recommendation listings having a higher bid amount will be listed higher than sponsored recommendation listings having lower bid amounts.

Continuing the example above, then, the web page including the content matching the user's interest in COLDPLAY and the recommendations drawn from appropriate online communities also include a set of sponsored recommendations matching the search term COLDPLAY. One exemplary sponsored recommendation listing includes a title COLDPLAY CONCERT TICKETS, and the text "Interested in Coldplay concert tickets? Best seats, best prices. Click Here," and a hyperlink. Another exemplary sponsored recommendation listing includes a title "FOR COLDPLAY FANS," and the text, "If you like Coldplay, give Tori Amos a listen," and a hyperlink or a button to click. Any other content access technology may be used in place of the World Wide Web example provided here.

The user recommendation system 112 may receive a user request from the content engine web server 106 directly or via the communications network 116. The user recommendation system 112 may also receive the request from the user client system 102. User recommendation system 112 may obtain community information associated with the query or the user from the music database 114.

Figure 2:
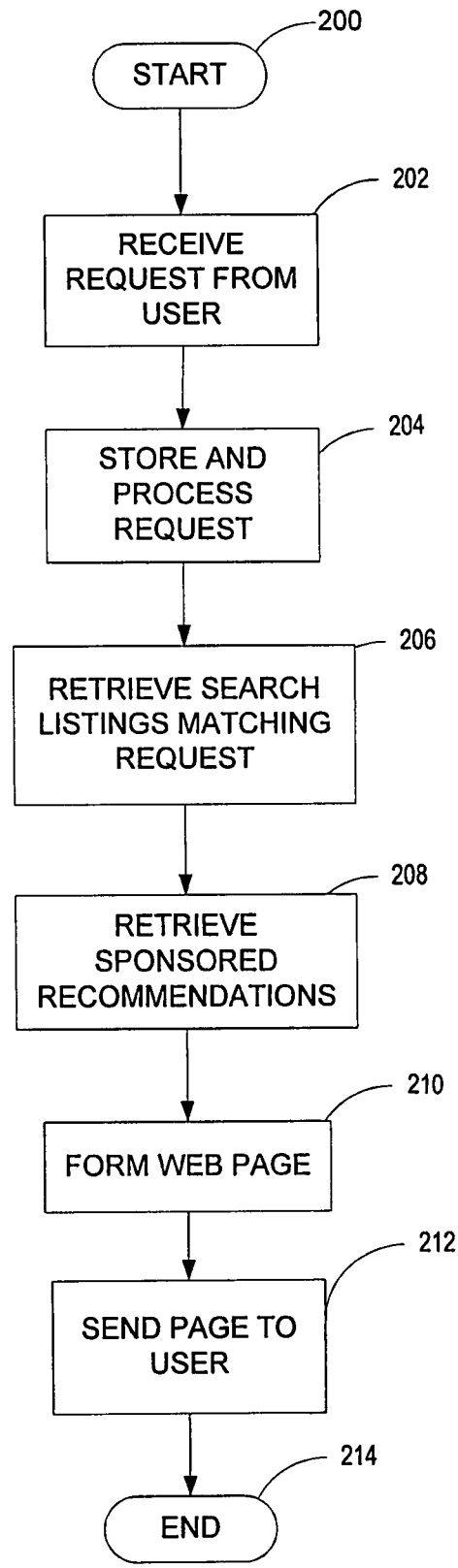
FIGS. 2-6 are flow diagrams illustrating operation of the architecture of FIG. 1.

FIGS. 2-6 are flow diagrams illustrating one aspect of operation of the architecture of FIG. 1. FIG. 2 illustrates operation to provide a web page to a user in response to a user request. A request is received from a user over any suitable communication channel such as the communications network 116 from a user. A request occurs any time a user explicitly searches for content such as a song, video or other information, or any time there is an implicit call for further content. For example, a user may submit a content search request for content listings matching a keyword. The system responds with matching content listings, such as a list of song or video titles; and provides sponsored recommendations as well. In another example, when a song or video is played to the user and ends, there is an implicit call for additional content to be played. This implicit call is another type of request. The method begins at block 200.

At block 202, a request is received from a user. The request may include information formatted by a web browser operating on a user device such as the user client device 102. The request is accompanied by music-related information of the user. For example, the request may include a keyword which is a song title, an artist's name, a musical genre, or other information. In another example, the request includes information defining a musical selection made by the user. For example, the user may be using the user device to view a page of song titles or artist names. Upon clicking one of the song titles, information about that selection is conveyed to the user recommendation system 112. In another example, the user is invited on a displayed web page to rate songs or artists, for example, by clicking a number of stars displayed on the web page. More stars indicate a higher rating and greater preference for this user. The number of stars selected by the user may be included in the request. Other examples may be imagined as well. Further, the request preferably includes user identification information, such as a user name, account number, password, etc.

The request is conveyed to various destinations of the architecture 100. For example, the request is conveyed to the content engine 106 to retrieve information relevant to the request. The retrieved information may include sponsored search results in which advertisers have bid on keywords. Also, the request is conveyed to the user recommendation system 112 to provide recommendations to the user.

At block 204, the request is stored and processed. Any relevant information about the request may be saved, such as the music related information of the user and the user identification information. The information may be saved at any appropriate location such as the music database 114 or the database 120 of the account management system 110.

Further, the request is processed to determine user preference information. Any suitable processing may be implemented to extract from the request information about this user's preferences and to relate the information about this user to musical preference information of other users. In one example, a collaborative filtering process is applied to predict ratings for this user for this song, artist or genre, etc. for all other songs, artists and genres in the music database 114. Alternatively, statistics may be maintained and updated in response to the request to reflect preferences of this user. If the user is a member of one or more online communities, the community information may be updated in response to the request, or the user may be added to one or more already existing communities.

At block 206, matching content listings are retrieved for the request. This act applies only if the user has submitted a content request in the form of a search query, seeking information related to a submitted keyword. A search system such as the content engine web server 106 receives the content search request and obtains matching content listings. This may be done in any suitable manner. The matching content listings are ordered as content search results according to any algorithm.

At block 208, sponsored recommendations are retrieved by the user recommendation system 112. Using user preference information for this user and for other users, either individually or in the aggregate, recommendations are selected and ordered. Additional details about this process will be provided below in conjunction with FIGS. 3-6.

At block 210, a web page is formed with the content listings retrieved at block 206 and with the sponsored recommendations retrieved at block 208. In one embodiment, the content listings are generally centered and more prominent on the page and the sponsored recommendations are less prominent, such as placed in the margin of the page. Other information such as logos and banner advertisements may be formatted into the page as well.

At block 212, the page is sent to the user. Preferably, the page is rendered as an HTML page and transmitted over the communications network 116 to the user device which originated the request. The method of FIG. 2 ends at block 214.

Figure 3:
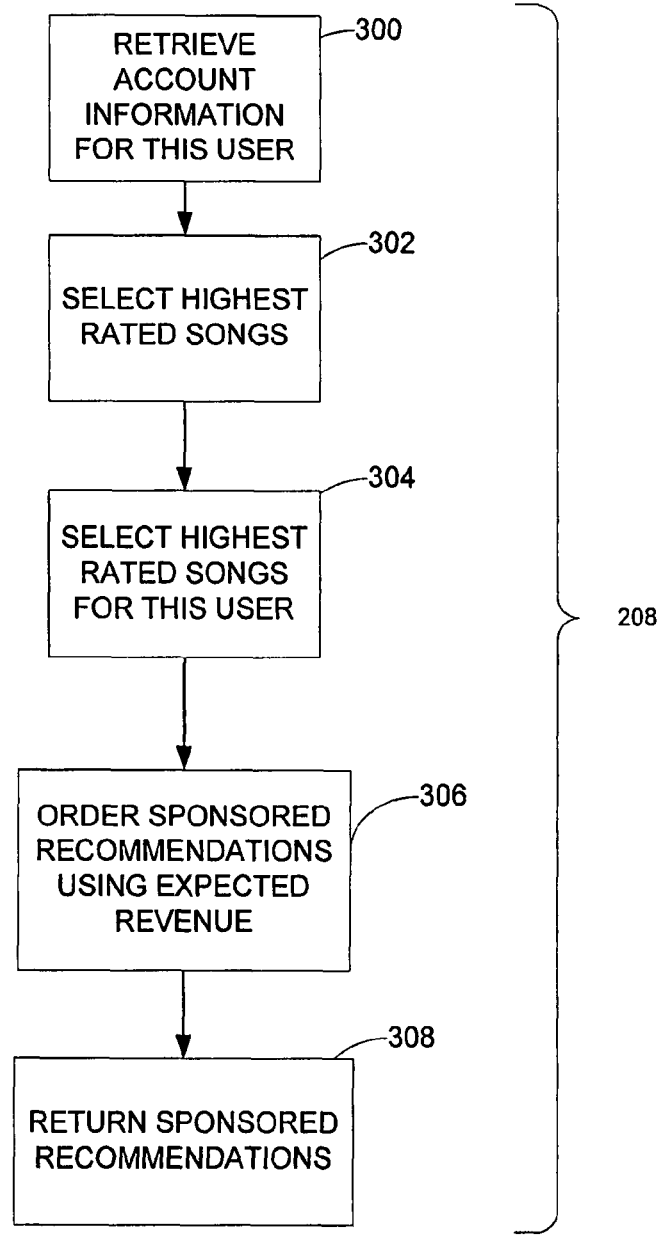

FIG. 3 illustrates one set of acts which may be performed as part of the act of retrieving sponsored recommendations at block 208 of FIG. 2. The process illustrated in FIG. 3 may be implemented, for example, as a subroutine to be called after processing block 206 of FIG. 2.

At block 300, account information for the current user is retrieved. This may be done, for example, using user identification information included in the request.

At block 304, the highest rated songs for this user are selected. Using the account information retrieved in block 302 and the body of musical preferences for this user and other similar users, ratings are determined for each song and/or for each artist, genre, etc., maintained in the music database 114. For example, the ratings may be based on the result of collaborative filtering this user's selections with the remainder of the users in the database 114. Alternatively, ratings may be based on demographic information about users, such as age, location, gender, race, as well as musical preferences.

At block 306, the sponsored recommendations to be provided to the user are ordered using expected revenue. The advertisers who sponsor the sponsored recommendations bid on the opportunity to send their recommendations to the user. The bids may be based on user behaviors and interests, particularly for those of desirable users. For example, an advertiser might bid $2 for the opportunity to present his sponsored recommendation to users under age 30 who like the artist Neil Young. The advertiser's bid might be relatively high because he wants to recommend to the user songs by a similar artist, such as Bob Dylan. Alternatively, the advertiser's bid might be relatively low because he wants to recommend to users songs by an unrelated artist or in an unrelated genre, but he sees value in recommending to the users having the demographics of Neil Young listeners.

Expected revenue in one example is the product of bid amount and clickthrough rate. Preferably, the ratings for a song or other recommendation are biased according to expected revenue. That is, the song likely to produce the highest expected revenue to the operator of the online marketplace is ranked highest. A clickthrough rate is obtained historically, by tracking clickthroughs by all users of the system. The clickthrough rate in this example is multiplied by the bid for each song to order the songs which form the sponsored recommendations. Also, if other information such as artists or genres are to be recommended, the same process can be similarly applied.

At block 308, the sponsored recommendations are returned and processing continues at block 210 of FIG. 2.

Figure 4:
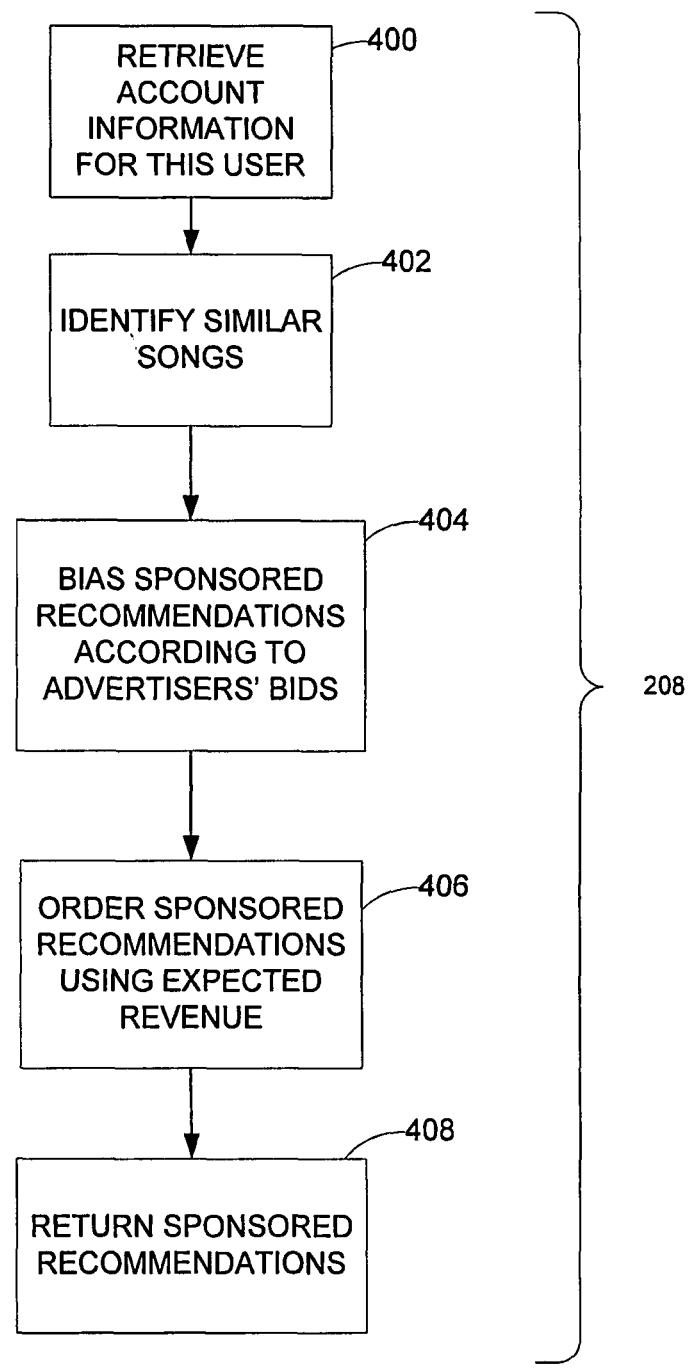

FIG. 4 illustrates an alternative set of acts which may be performed as part of the act of retrieving sponsored recommendations at block 208 of FIG. 2. The process illustrated in FIG. 4 may be implemented, for example, as a subroutine to be called after processing block 206 of FIG. 2. At block 400, account information for the user is retrieved, similar to block 300 of FIG. 3.

At block 402, songs which are similar to the song specified in the request received at block 202, FIG. 2, are identified. The relative similarity of songs may be determined in any suitable way. Preferably, similarity is determined by a process of identifying user preferences, such as collaborative filtering of the song relative to the contents of the music database 114 of FIG. 1. Alternatively, statistical or other methods may be used. In general, a rating for each song is developed or determined. Still further, in addition to or instead of identifying similar songs, one or more similar artists may be identified using the same or similar techniques. The similar songs or artists identified in block 402 are identified as sponsored recommendations.

At block 404, the sponsored recommendations are biased according to the advertisers' bids. The rating for a song is increased, decreased or left untouched based on the advertisers' bids.

At block 406, the sponsored recommendations are ordered using the expected revenue for the songs based on advertisers' bids and clickthrough rates. At block 408, the sponsored recommendations are returned and processing continues at block 210 of FIG. 2.

Figure 5:
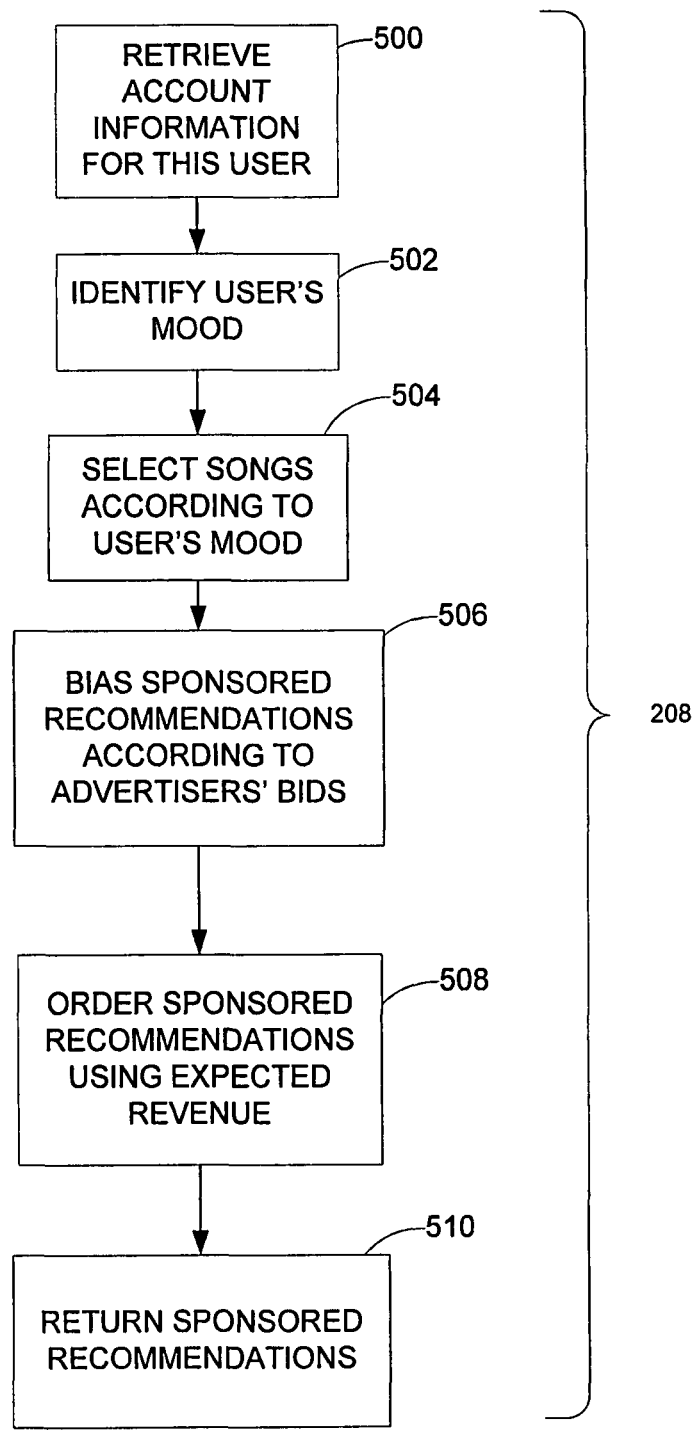

FIG. 5 illustrates an alternative set of acts which may be performed as part of the act of retrieving sponsored recommendations at block 208 of FIG. 2. At block 500, account information for the user is retrieved, similar to block 300 of FIG. 3.

At block 502, the mood of the user is identified. Any suitable process can be used to determine the mood of the user. For example, recent musical selections or the user's interaction with the online information system may be analyzed to identify a mood. Each song in the database may include associated mood information. Thus, for example, if songs requested in a set time period such as 15 minutes have the same or similar mood information, the user recommendation system may determine the mood of the user. Possible moods include "party," "quiet," etc.

At block 504, songs which form the sponsored recommendations are selected according to the identified user's mood. The rating for a song is increased, decreased or left untouched based on the advertisers' bids.

At block 506, the sponsored recommendations are biased according to the advertisers' bids. The rating for a song is increased, decreased or left untouched based on the advertisers' bids.

At block 508, the sponsored recommendations are ordered-using the expected revenue for the songs based on advertisers' bids and clickthrough rates. At block 510, the sponsored recommendations are returned and processing continues at block 210 of FIG. 2.

Figure 6:
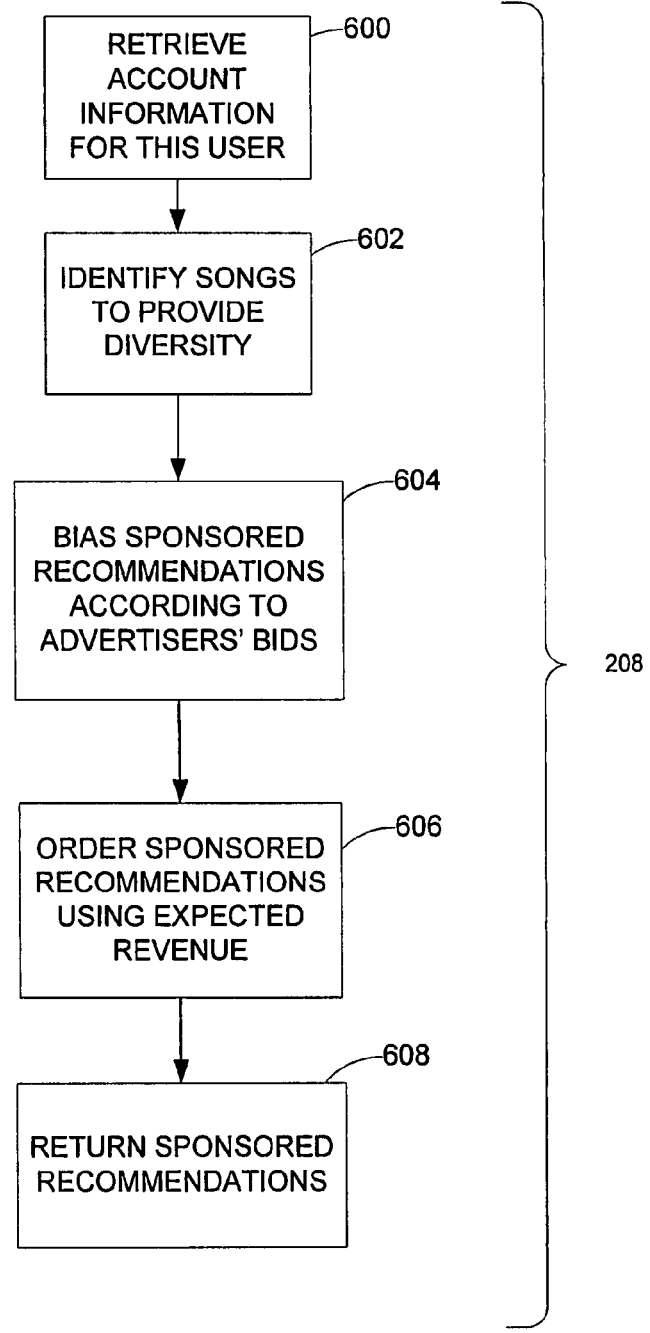

FIG. 6 illustrates an alternative set of acts which may be performed as part of the act of retrieving sponsored recommendations at block 208 of FIG. 2. At block 600, account information for the user is retrieved, similar to block 300 of FIG. 3.

At block 602, songs are identified to provide diversity in recommendations. Diversity relates to a goal of ensuring that a user is exposed to a wide range of songs or artists. The diversity of one song relative to another may be determined based on input information and based on the user's behavior with other songs recommended to the user. The identified songs form the sponsored recommendations.

At block 604, the sponsored recommendations are biased according to the advertisers' bids. The rating for a song is increased, decreased or left untouched based on the advertisers' bids.

At block 606, the sponsored recommendations are ordered using the expected revenue for the songs based on advertisers' bids and clickthrough rates. At block 610, the sponsored recommendations are returned and processing continues at block 210 of FIG. 2.

From the foregoing, it can be seen that the present invention provides method and apparatus for providing sponsored recommendations in an online music system. User behavior, such as content search requests received, songs selected for playback and artists selected, is monitored and processed. Using this information, music that the user likes is identified and used to select song recommendations for the user. In addition, using this information, a list of songs the user may also be interested in is also provided as recommendations. These additional recommendations are sponsored recommendations in that their provision and ranking is based in part on a bid amount provided by an advertiser or other information provider. An advertiser who wants to recommend a song or artist to the user, based on that user's history and selections, may bid on the user's behavior to have the song or artist recommended to the user.

While the embodiments herein have been described in conjunction with a music recommendation system, it should be recognized that these techniques can be readily extended to other types of information for which a user expresses an interest or a preference, and for which advertisers or information providers may wish to make recommendations to the user.

Although selected aspects, features, or components of the implementations are depicted as being stored in memories, all or part of the systems, including the methods and/or instructions for performing such methods consistent with the user recommendation system, may be stored on, distributed across, or read from other machine-readable media, for example, secondary storage devices such as hard disks, floppy disks, and CD-ROMs; a signal received from a network; or other forms of ROM or RAM either currently known or later developed.

Specific components of a user recommendation system may include additional or different components. A processor may be implemented as a microprocessor, microcontroller, application specific integrated circuit (ASIC), discrete logic, or a combination of other types of circuits or logic. Similarly, memories may be DRAM, SRAM, Flash, or any other type of memory. Parameters (e.g., popularity rankings), databases, and other data structures may be separately stored and managed, may be incorporated into a single memory or database, or may be logically and physically organized in many different ways. Programs or instruction sets may be parts of a single program, separate programs, or distributed across several memories and processors.

It is therefore intended that the foregoing detailed description be regarded as illustrative rather than limiting, and that it be understood that it is the following claims, including all equivalents, that are intended to define the spirit and scope of this invention.

The invention claimed is:

1. A computer-implemented method for an online music system, the method comprising:
  at a user recommendation system, communicating to a user a web page which includes user-selected songs, wherein selection of the user-selected songs is based on a current selection of songs by a user or on preferences of the user;
  at the user recommendation system, selecting one or more additional recommended songs from a set of sponsored music recommendations, each of the set of sponsored music recommendations being associated with an information provider having an account on the online music system and a computer network location, the selection of the additional recommended songs being based on the preferences of the user;
  at the user recommendation system, providing to the user on the web page information about the one or more additional recommended songs;
  at the user recommendation system, detecting selection by the user of an additional recommended song; and
  upon detecting the selection by the user, paying to an operator of the user recommendation system from the account of an information provider associated with the additional recommended song selected by the user.

2. A computer-implemented database method comprising:
  at a server, presenting to a user a web page including selected content, selection of the selected content based on user selection or on previously determined user preferences;
  at a user recommendation system in communication with the server, selecting one or more additional recommended selections from a set of sponsored recommendations, each of the set of sponsored recommendations having associated therewith an information provider and a computer network location, selection of the additional recommended selections being based on previously determined user content preferences;
  at the server, presenting to the user on the web page the one or more additional recommended selections;
  at the user recommendation system, detecting selection by the user of an additional recommended selection from the set of sponsored recommendations;
  at the server, upon detection of selection by the user, presenting the additional recommended selection to the user and paying to an operator of the user recommendation system from the information provider associated with the additional recommended selection selected by the user.

3. The database method of claim 2 further comprising:
  at the user recommendation system, monitoring user interaction with the web page; and
  at the user recommendation system, updating user preference information based on the user interaction; and
  at the user recommendation system, selecting content for subsequent web pages based on the user preference information; and
  at the user recommendation system, selecting recommended selections from the set of sponsored recommendations based on the user preference information.

4. The database method of claim 3, further comprising:
  at an advertising account management system, associating with each of the set of sponsored recommendations a bid amount to be transferred from a information provider; and
  at the user recommendation system, selecting recommended selections from the set of sponsored recommendations to maximize expected revenue from the information provider.

5. A computer-implemented method for providing music information to an online user, the method comprising:
  in a database, storing a music database of songs to be provided to users;
  in a database, storing a recommendation database of songs, each song being associated with an information provider and a money amount;
  by a content engine web server in data communication with the music database and the recommendation database, providing songs from the music database on a web page sent to a user in response to user requests;
  by a processor of a user recommendation system in data communication with the content web server collecting user preference information about the provided songs and/or other songs in the music database; and
  based on the user preference information, by the user recommendation system, providing recommended songs from the recommendation database on the web page sent to the user; and
  by the processor of the user recommendation system, detecting that the user has selected a recommended song, and debiting the money amount from an account of the information provider associated with the selected recommended song to an operator of the music database of songs.

6. The method of claim 5 further comprising:
  by the processor of the user recommendation system, collaboratively filtering user preference information for a plurality of users including the user; and
  based on the collaborative filtering, by the processor of the user recommendation system, identifying songs in the user recommendation database to be provided to the user.

7. The method of claim 6 wherein providing songs from the content database comprises:
  based on the collaborative filtering, by the processor of the user recommendation system, identifying songs in the content database to be provided to the user.

8. A computer-implemented method for operating a music database, the method comprising:
  storing a music database of song files by a database operator;
  in response to subscriber requests, playing requested song files to a subscriber;
  collecting preference data from subscribers based on subscriber interaction with the database of song files;

storing a database of recommended items, each recommended item including a recommended song file, a money amount and an information provider, the money amount payable to the database operator by the information provider when the recommended item is selected by a subscriber; and providing a web page to the subscriber, including information about one or more song files from the database of song files, and information about one or more recommended song files, the one or more recommended song files selected for presentation to the subscriber based on the collected preference data from the subscriber.

9. The method of claim 8 wherein providing a web page to the subscriber comprises:

providing a list of song titles on the web page, the list of songs selected based on the collected preference data from the subscriber; and providing a list of recommended song titles, the list of recommended song titles selected from the database of recommended items based on the collected preference data from the subscriber.

10. The method of claim 8 wherein providing a web page to the subscriber comprises:

providing a list of recommended song titles, the list selected to maximize expected revenue to the database operator as a result of subscriber selection of a recommended song title.

11. The method of claim 8 wherein providing a web page to the subscriber comprises:

providing a list of recommended song titles, the list selected based on song similarity between the recommended song titles and song files favored by the subscriber as determined by the collected preference data from the subscriber.

12. The method of claim 8 wherein providing a web page to the subscriber comprises:

providing a list of recommended song titles, the list selected based on current mood of the subscriber as determined by the collected preference data from the subscriber.

13. The method of claim 8 wherein providing a web page to the subscriber comprises:

providing a list of recommended song titles, the list selected to increase diversity of songs titles provided to the subscriber.

14. A computer-implemented database system for providing content to users, the database system comprising:

a content database;

a content engine web server coupled with the content database to provide content to a user, the content selected from the content database to users based on user preferences;

a sponsored recommendation database;

a sponsored recommendation system coupled with the sponsored recommendation database to provide sponsored recommendations to the user based on the user preferences; and a server coupled with the content engine web server and the sponsored recommendation System to transmit to the user a web page including the selected content combined with the sponsored recommendations, wherein the sponsored recommendation database comprises a plurality of items, each item being associated with an information provider, and for which the associated information provider gives economic value to a network service provider when the item is selected by a user after the server transmits the web page including the item to the user.

15. The database system of claim 14 further comprising:

user preference data defining user preferences; and a user preference learner configured to monitor user interactions with the database system to identify the user preferences based on the user interactions.

16. The database system of claim 15 wherein the user preference learner comprises a collaborative filter.

17. A computer-implemented music database system comprising:

a music database;

a user preference learner coupled with the server to monitor user interactions with the music database system to identify user preferences based on the user interactions;

sponsored recommendation database which stores recommended song files, each recommended song file being stored with a money amount and an information provider identification, the money amount being payable to an operator of the music database by the information provider when a recommended song file is referred to a user and is selected by a user; and a server coupled with he music database for serving web pages to a subscriber, a served web page including information identifying song files from the music database to subscribers; the song files selected based on identified user preferences for the subscriber, the served web page further including information identifying one or more recommended song files, the recommended song files selected based on the identified user preferences for the subscriber.

18. The method of claim 1 further comprising:

at a database, for each of the set of sponsored music recommendations, storing a Uniform Resource Locator (URL) for a web page at the computer network location to which the user's browser will be redirected upon a clickthrough of the sponsored music recommendation, and a bid amount for controlling position among the one or more additional recommended song at which the respective sponsored music recommendation listing will appear.

19. The database method of claim 2 further comprising:

storing in a data store the set of sponsored recommendations including storing an associated Uniform Resource Locator for the computer network location and a bid amount selected by the information provider;

and wherein presenting the one or more additional recommended selections to the user on the web page comprises providing the one or more additional recommended selections as a list adjacent to the selected content, the list ordered using the respective bid amounts of respective sponsored recommendations of the set of sponsored recommendations.

20. The database method of claim 19 further comprising:

determining at the server expected revenue for the respective sponsored recommendation of the set of sponsored recommendations; and ordering the list or recommended selections using the determined expected revenue.

21. The database system of claim 14 wherein the sponsored recommendation database stores recommended song files, each recommended song file being stored with a money amount and an information provider identification, the money amount being payable by the information provider when a recommended song file is referred to a user and is selected by a user, and wherein the sponsored recommendation system provides one or more recommended song files as the sponsored recommendations.

22. The database system of claim 14 wherein the content engine web server is configured to detect that the user has clicked a sponsored recommendation to select a recommended song.

23. The database system of claim 22 further comprising:

an account management system in data communication with the content engine web server, the account management system configured to store account information for respective information providers associated with respective sponsored recommendations, the account information including for each respective sponsored recommendation a bid amount, and a computer network location to which a browser of the user will be redirected upon selection by the user of the respective sponsored recommendation, the content engine web server being further configured to debit the account information of a respective information provider by the respective bid amount when the respective sponsored recommendation is selected by the user.

* * * * *